(12) United States Patent
Canavan

(10) Patent No.: US 8,985,904 B1
(45) Date of Patent: Mar. 24, 2015

(54) METHOD AND APPARATUS FOR LAUNCH AND RETRIEVAL OF A LINE ARRAY ATTACHED TO A TOWBODY

(71) Applicant: Lockheed Martin Corporation, Bethesda, MD (US)

(72) Inventor: Thomas M. Canavan, Tully, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/633,251

(22) Filed: Oct. 2, 2012

(51) Int. Cl.
*F16L 1/00* (2006.01)
*F16L 1/12* (2006.01)

(52) U.S. Cl.
CPC .......................................... *F16L 1/12* (2013.01)
USPC ........................................................... 405/158

(58) Field of Classification Search
USPC .............. 405/158, 166, 171, 173; 367/15, 16, 367/106, 130
See application file for complete search history.

(56) References Cited

U.S. PATENT DOCUMENTS

| 4,581,723 | A | * | 4/1986 | Savit ................................ 367/20 |
| 5,902,072 | A | * | 5/1999 | Berges ........................... 405/173 |
| 7,252,046 | B1 | * | 8/2007 | Ead et al. ........................ 114/254 |
| 2010/0242823 | A1 | | 9/2010 | Kurpiewski | |

* cited by examiner

*Primary Examiner* — Doug Hutton, Jr.
*Assistant Examiner* — Patrick Lambe
(74) *Attorney, Agent, or Firm* — Howard IP Law Group, PC

(57) ABSTRACT

A system and method of operating a sonar system is provided. The sonar system comprises a towed body, such as a depressor body, with a towed line array attached thereto configured to be towed behind a host vessel. A line feed mechanism is operative to recover and/or deploy the towed line array from the vessel while the towed line array remains attached to the towed body.

17 Claims, 5 Drawing Sheets

METHOD AND APPARATUS FOR LAUNCH AND RETRIEVAL OF A LINE ARRAY ATTACHED TO A TOWBODY

FIELD OF INVENTION

The present invention relates generally to sonar systems, and more particularly, to launch and retrieval systems for sonar devices.

BACKGROUND

Civilian and military sea vessels use active and passive sonar systems for numerous applications including geological studies, marine life exploration, and military operations such as anti-submarine warfare (ASW). These systems are used to detect the presence of submerged objects by either transmitting a sound wave and detecting its reflection as it propagates through the water (active sonar) or by listening for sound waves generated by these objects (passive sonar).

The relative usefulness of active versus passive sonar systems is a function of various factors. For example, active sonar is desirable for applications that require an estimated bearing and range of a potential target. This is normally accomplished by the transmission of a sound wave (a "ping"). While providing range and bearing information of a target however, this transmission also increases the likelihood of detection by other vessels.

The use of passive sonar systems may be advantageous over active systems for stealth operations, such as ASW, as a host vessel's location is not reveled by the use of these systems. A drawback of passive sonar, however, is its susceptibility to interference, particularly noise emitted from the host vessel. For example, noise from the vessel's propulsion system may negatively impact the operation of a passive system. This is especially true in the case of hull-mounted arrays, where hull-born vibrations and other noises are transferred directly to the sonar transducers. In order to locate the array further from the vessel's noise-producing components, and thus reduce interference, sonar arrays are often towed behind vessels.

These towed arrays generally comprise hydrophone arrangements that are deployed and recovered through openings in the hull of a vessel, or over the gunwale of a ship. A winch and/or boom arrangement is often utilized to recover the array. Such handling equipment occupies a large amount of deck space in addition to presenting a large target cross-section to enemy radar. Thus, these arrangements limit covert deployment and recovery. Deployment and recovery is also time consuming and difficult, particularly in high seas. Active sonar devices may also take the form of towbodies configured to be deployed and recovered by a host vessel. Conventional launch and retrieval methods include reeling in a tow-cable attached to the towbody, and hoisting the towbody into a cradle or onto a ramp arranged on the vessel.

These methods for launch and retrieval create difficulties for vessels deploying both active and passive systems. Previous solutions include increasing the size of the host vessel to accommodate independent systems for deploying and recovering active and passive sonar equipment. Other prior art systems utilize a towed line array (TLA) detachably connected to the towbody. In these systems, the TLA is disconnected from the towbody and stored after the towbody has been recovered. This arrangement requires the host vessel to be manned, and thus, is unsuited for applications in remotely operated vessels, such as unmanned surface vehicles (USVs). This is particularly detrimental as the probability of detection is increased with the use of an active sonar system, and thus, it would be advantageous to be able to implement these systems into relatively low cost platforms, including USVs.

Improved systems are desired.

SUMMARY OF THE INVENTION

In one embodiment of the present disclosure, a sonar system comprising a towed body containing transmit array elements having a TLA attached thereto containing the receive array elements is configured to be deployed behind a host vessel. A line feed mechanism is provided for at least one of recovering and deploying the TLA to and/or from the vessel when the towed body is in a recovered position on the vessel. The TLA is configured to remain attached to the towed body during recovery and deployment.

In another embodiment of the present disclosure, an apparatus adapted to be mounted on a vessel for at least one of deploying and recovering a TLA attached to a towed body is provided. The apparatus comprises a line feed system configured to engage with at least a portion of the TLA when the towed body is in a recovered position. The line feed system is operative to displace a portion of the TLA relative to the vessel while the TLA remains attached to the towed body.

A method for at least one of deploying and recovering a TLA attached to a towed body to and/or from a vessel is also provided. The method comprises the steps of holding the towed body in a recovered or stored position and at least one of recovering and deploying the TLA by activating a line feed system. The line feed system is configured to displace a portion of the length of the TLA with respect to the vessel while remaining attached to the towed body.

BRIEF DESCRIPTION OF THE DRAWINGS

FIGS. 4a and 4b are front and side views, respectively, of the towbody of

FIGS. 2a and 2b after recovery by the host vessel.

DETAILED DESCRIPTION

Figure 1:
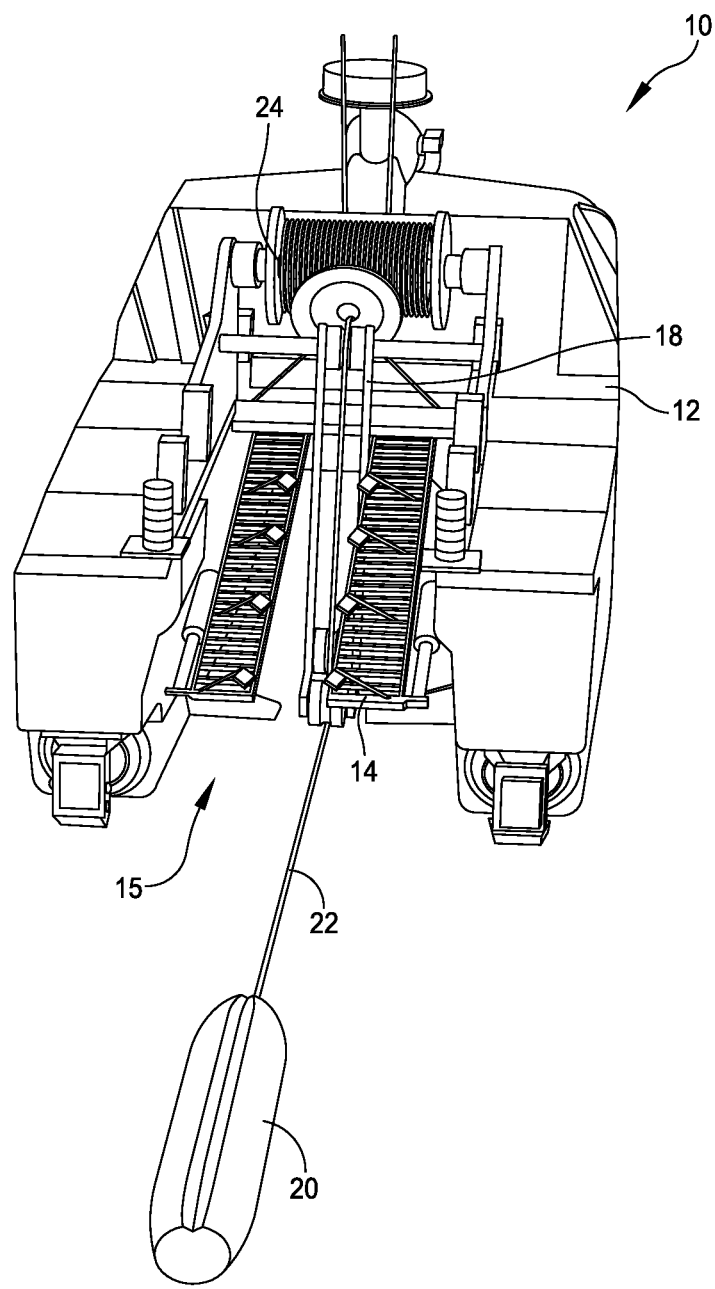
FIG. 1 is a perspective view of an exemplary towed sonar system useful for describing embodiments of the present disclosure.

It is to be understood that the figures and descriptions of the present disclosure have been simplified to illustrate elements that are relevant for a clear understanding of the present disclosure, while eliminating, for purposes of clarity, many other elements found in typical sonar systems, such as towed sonar array arrangements. However, because such elements are well known in the art, and because they do not facilitate a better understanding of the present disclosure, a discussion of such elements is not provided herein. The disclosure herein is directed to all such variations and modifications known to those skilled in the art.

In the following detailed description, reference is made to the accompanying drawings that show, by way of illustration, specific embodiments in which the disclosure may be practiced. It is to be understood that the various embodiments of the disclosure, although different, are not necessarily mutually exclusive. Furthermore, a particular feature, structure, or characteristic described herein in connection with one embodiment may be implemented within other embodiments without departing from the scope of the disclosure. In addition, it is to be understood that the location or arrangement of individual elements within each disclosed embodiment may be modified without departing from the scope of the disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout several views.

As set forth above, numerous drawbacks may be associated with deploying both active and passive sonar assets on, for example, an unmanned or relatively small vessel. Embodiments of the present disclosure may address some or all of these obstacles by providing an integrated deployment and recovery system for both transmit and receive sonar assets which does not require an operator aboard the host vessel to facilitate/participate in launch and recovery operations. In one embodiment, a host vessel is provided for deploying and retrieving a towbody having a TLA of receiving sonar sensors attached thereto. The host vessel is configured to deploy, recover and store the towbody, as well as recover the TLA using a line feed system without detaching the TLA from the towbody. These embodiments provide high active sonar performance in a compact stowed configuration. More specifically, the flexible, reelable nature of the TLA allows for sufficient array size, and thus ample acoustic power, free of any constraints imposed by the towbody and/or host platform dimensions.

Referring generally to FIG. 1, an exemplary system 10 including a host vessel 12 useful for describing embodiments of the present disclosure is shown. In the exemplary embodiment, vessel 12 comprises, for example, an unmanned surface vehicle (USV) having a bay 15 configured to store a towbody 20, such as a variable depth sonar (VDS) towbody. FIG. 1 shows towbody 20 in a deployed state, wherein towbody 20 is towed behind or aft of vessel 12 by a towline 22. Towline 22 may be attached to, for example, a winch 24 operative to deploy and/or recover towbody 20 to and from bay 15 and which may be used to control running depth of towbody 20 by varying deployed scope of towline 22. Vessel 12 may comprise a guide arm 18 arranged on, for example, a rotatable axle configured to pivot guide arm 18. Guide arm 18 may aid in recovering towbody 20 at a desired angle. Specifically, during recovery of towbody 20, winch 24 may retract towline 22 with guide arm 18 rotated into a position such that towbody 20 is lifted onto a ramp or cradle structure 14 at a desired angle.

It should be understood that the arrangement of FIG. 1, including vessel 12, winch 24 and ramp 14 comprises only an exemplary host vessel and launch/recovery system. Embodiments of the present disclosure may be used with various types of vessels, including manned or unmanned vessels having alternate towbody launch/recovery systems.

Figure 2A:
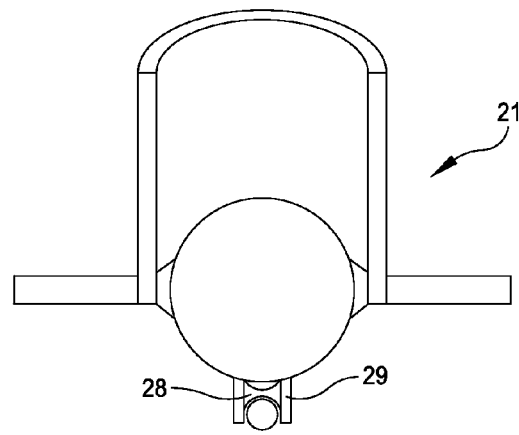
FIGS. 2a and 2b are front and side views, respectively, of a towbody and TLA according to an embodiment of the present disclosure.
Figure 2B:
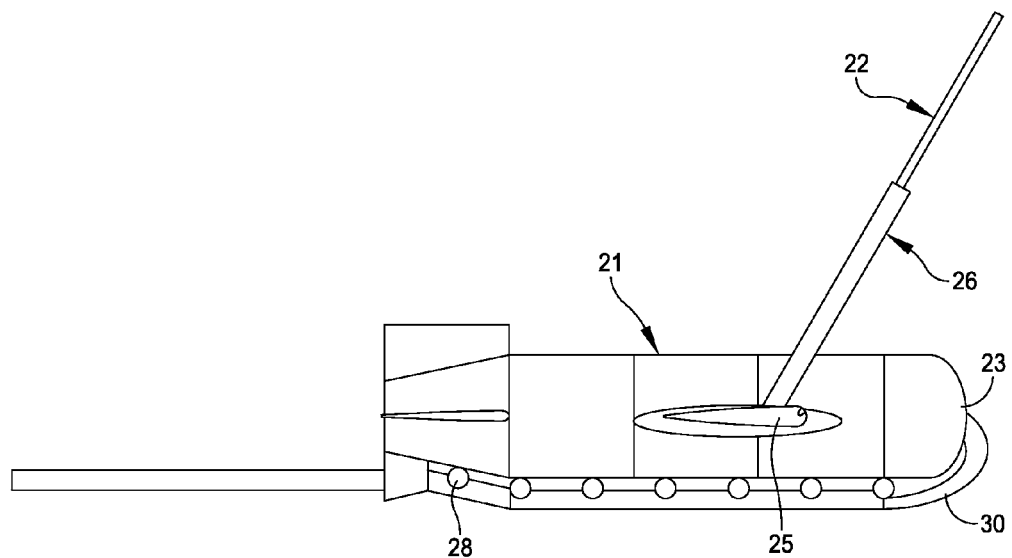

Referring generally to FIGS. 2a and 2b, a towbody 21, for example, a depressor towbody, according to an embodiment of the present disclosure is shown. Towbody 21 may be fitted with a towbail 26 for attaching to towline 22. In one embodiment, towbail 26 is pivotally attached to towbody 21, ensuring optimal alignment between towline 22 and towbody 21 at varying depths, and according to varying weight, drag and lift forces acting on towbody 21. Towbody 21 may further comprise control surfaces 25 configured to provide depth control. Surfaces 25 may be remotely controlled, or set at a predetermined angle of attack prior to the deployment of towbody 21 or vessel 12 (FIG. 1).

As set forth above, towbody 21 may comprise a VDS towbody configured to perform active sonar operations. In order to incorporate passive-sonar capabilities into system 10, a TLA 30 may be attached to towbody 21. TLA 30 may comprise a plurality of passive sonar sensors, such as hydrophones. The hydrophones may comprise transducers, such as piezoelectric-based transducers, as are commonly used in sonar applications. In one embodiment, the hydrophones are arranged linearly within a housing. The housing may comprise a flexible material including by way of example only, plastic, rubber, other polymers, or composites, and may be fluid, gel or solid filled, in order to aid wave propagation therethrough.

In one embodiment of the present disclosure, a first end of TLA 30 may be attached to a front portion 23 of towbody 21. In a deployed state (FIG. 2b) TLA 30 may extend from front portion 23, through a guide space 29 arranged on an outer surface of towbody 21, and into tow behind towbody 21. Guide space 29 may comprise, by way of example only, a generally U-shaped channel sized correspondingly to TLA 30. In one embodiment of the present disclosure, a portion of guide space 29 may be enclosed, thereby capturing TLA 30 and ensuring it remains arranged within guide space 29 during deployment, recovery and use. Guide space 29 may extend along all or part of the length of towbody 21, and may be oriented such that TLA 30 exits generally from the rear of towbody 21.

TLA 30 may be supported or oriented within guide space 29 by a plurality of rollers 28 arranged therein. In one embodiment of the present disclosure, rollers 28 may be free-spinning (i.e. idle rollers), and operative to both accurately position (i.e. guide) TLA 30 within guide space 29, as well as eliminate friction between towbody 21 and the outer housing of TLA 30 during deployment and recovery. Rollers 28 may be arranged along all or part of the length of guide space 29 and may comprise a generally complementary profile (similar radius) to that of TLA 30. It should be understood that rollers 28 may be substituted for other friction-reducing components, or eliminated entirely, without departing from the scope of the present disclosure.

Figure 3:
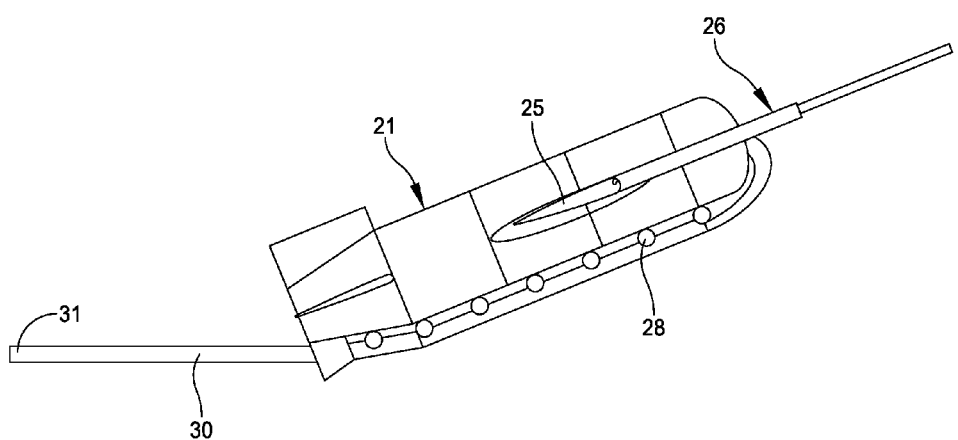
FIG. 3 is a side view of the towbody of FIGS. 2a and 2b being lifted into a host vessel.

Referring generally to FIG. 3, towbody 21 is shown in an inclined position, representative of an orientation which may occur while being recovered by or deployed from a host vessel. In the exemplary embodiment shown in FIG. 1, this positioning may correspond to recovering towbody 21 onto ramp 14. As winch 24 retracts towbody 21 into bay 15, towbail 26 is pivoted relative to towbody 21 according to the angle of towline 22, and towbody 21 is drawn onto ramp 14. In the illustrated embodiment, TLA 30 remains in a deployed state, with a second, free end 31 thereof extending from the rear of towbody 21.

Figure 4A:
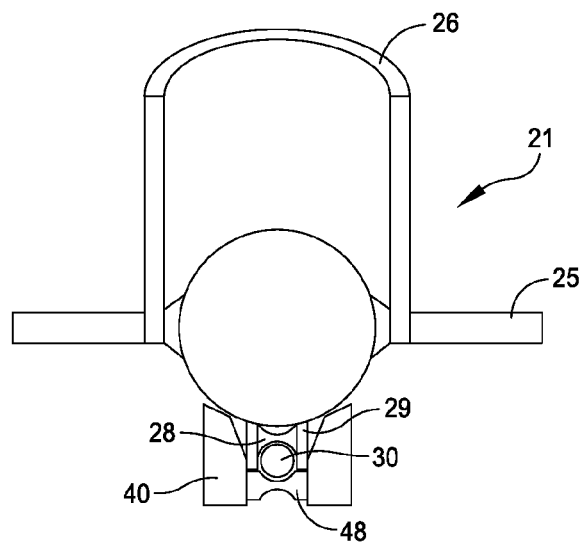
Figure 4B:
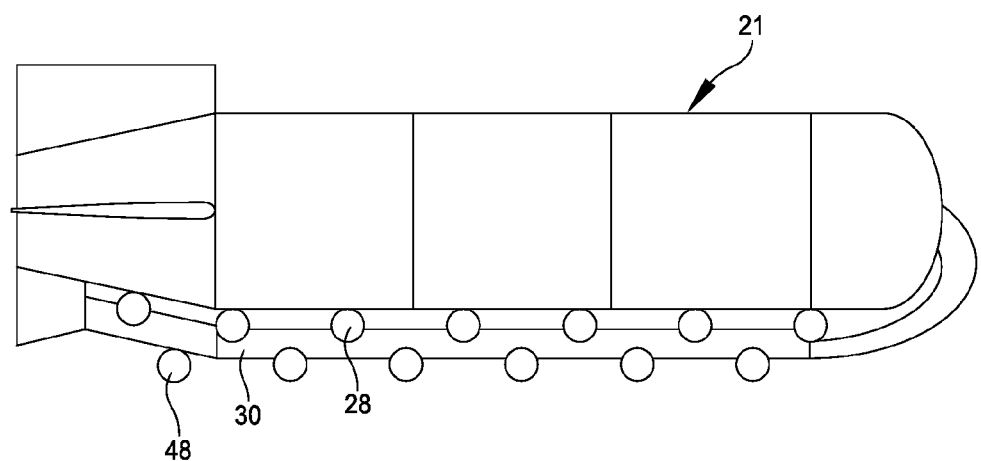

With reference to FIGS. 4a and 4b, towbody 21 is shown in a recovered position, such as after being received into bay 15 of vessel 12 (FIG. 1). As set forth above, towbody 21 may be lifted onto ramp 14 configured to receive and hold towbody 21 thereon. In order to recover TLA 30, ramp 14 may be provided with a drive system, such as a line feed mechanism operative to recover (e.g. retract) TLA 30 from a deployed state by displacing TLA 30 toward the front of towbody 21.

In the illustrated embodiment, a receiving portion, such as a guide or track 40 may be arranged within bay 15, for example, on ramp 14 (FIG. 1). Guide 40 may be configured to engage with a portion of towbody 21, for example, guide space 29. Thus, guide 40 may comprise a complementary profile with respect to guide space 29 for engaging therewith. In one embodiment, the line feed system may be incorporated into guide 40, and operative to engage with and displace TLA 30 with respect to towbody 21 in either direction (e.g. toward the front or rear of towbody 21). An exemplary line feed system may comprise, for example, rollers 48 configured to engage with TLA 30 on a side opposite rollers 28. In one embodiment, at least one roller 48 may be driven, by way of example only, by at least one electric or hydraulic actuator (not shown).

Still referring to FIGS. 4*a* and 4*b*, each of rollers 28,48 may comprise a complementary profile for engaging with TLA 30. In this way, TLA 30 is optimally supported and positioned within guide space 29 and guide 40, and the contact surface area between the at least one driven roller 48 is maximized, ensuring sufficient friction is generated to recover TLA 30 upon activation of the at least one driven roller 48. It should be understood that the friction generated between rollers 28,48 and TLA 30 may be altered by changing the relationship between rollers 28,48 and TLA 30. For example, rollers 28 may be arranged in a staggered relationship with respect to rollers 48 (see FIG. 4*b*). Further, friction may be increased or decreased by altering the offset distance between the centers of rollers 28 and centers of rollers 48. For example, a distance between rollers 28,48 of less than the diameter of TLA 30 would result in an increase in the friction generated. Accordingly, in one embodiment of the present disclosure, the relative positioning of rollers 28,48 may be adjustable. It should be understood however, that any number of rollers 28,48 may be used, in any configuration without departing from the scope of the present disclosure.

While embodiments of the present disclosure are shown and described with the at least one drive roller of the line feed system arranged generally on or attached to the vessel, it is further envisioned that the driving portion (e.g. roller) of the line feed system may be provided on towbody 21 without departing from the scope of the present disclosure. For example, at least one of rollers 28 may comprise a powered or driven roller, while rollers 48 arranged on host vessel 12 may be free-spinning, or eliminated entirely.

Moreover, while embodiments of the present disclosure show a line feed system utilizing idle and drive rollers, it is envisioned that the operation of retracting and/or deploying TLA 30 without detachment from towbody 21 may be carried out by any suitable means, including, for example, belt drives and/or an automated winch arrangement configured to displace (e.g. push or pull) a length of TLA 30 toward the front and/or rear of towbody 21.

Figure 5:
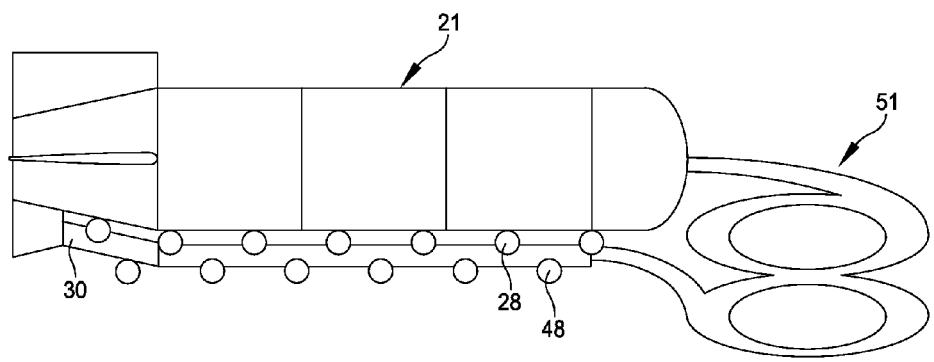
FIG. 5 is a side view of the towbody of FIGS. 2a and 2b with a TLA connected thereto and configured in a stored or recovered position.

With reference to FIG. 5, towbody 21 and TLA 30 are shown in an exemplary recovered position. Once guide space 29 of towbody 21 is positioned on or within guide 40, activation of the at least one driven roller 48 in a clockwise direction (with respect to FIG. 5) causes the displacement of TLA 30 generally toward the front of towbody 21. In this way, the length of TLA 30 exiting the rear of towbody 21 is fed forward, aided by the friction generated between the at least one driven roller 48 and TLA 30.

As the line feed system recovers TLA 30, a bailing mechanism (not shown), may be operative to coil a portion of the length of TLA 30 in a predetermined configuration, such as in a figure-eight, or flaked configuration 51. The flaked arrangement may be preferred as it negates the twist accumulation within the TLA commonly encountered with coiled arrangements via alternating left-hand/right-hand loops, thus reducing the risk of entanglement and/or damage to TLA 30 during recovery and deployment operations. In one embodiment of the present disclosure, the bailing mechanism may be automated, such that the recovery of TLA 30 may be performed without the need for on-board personnel. Thus, the arrangement may be suitable for use in unmanned vehicles.

Figure 6:
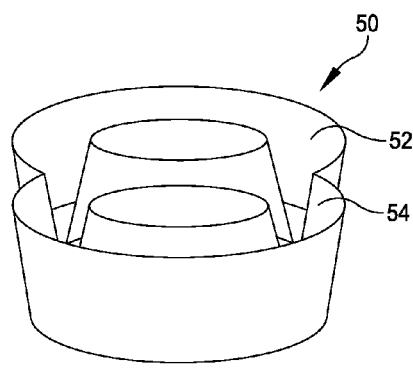
FIG. 6 is a perspective view of an exemplary stow basket useful for storing at least a portion of the TLA shown in FIG. 5.

Referring generally to FIG. 6, once recovered, TLA 30 may be stored in, for example, a complementary-shaped stow basket 50. Basket 50 may comprise two joined annular openings 52,54, corresponding to the exemplary flaked stowage configuration of TLA 30.

The exemplary operation of a system according to an embodiment of the present disclosure will now be described in reference to the preceding figures. In one embodiment of the present disclosure, an unmanned host vessel (FIG. 1) may be deployed to perform, for example, active sonar scanning operations in a designated area remote from its high value "mother ship". Onboard the vessel may be the above-described combination of transmit/receive sonar assets, for example, an transmit sonar towbody with a receive TLA attached thereto. TLA may be stored on the vessel with a first end thereof attached to the towbody (e.g. the front of the towbody), a second end thereof moveably positioned between the towbody and a line feed system, and a middle portion thereof stowed on the vessel (FIG. 5).

In an exemplary embodiment, TLA may be deployed first, with the towbody remaining onboard the vessel. The TLA is deployed by activating the above-described line feed system. Specifically, the system is operative to feed the length of TLA stored onboard the host vessel rearward with respect to the towbody, and into a deployed state behind the vessel. This may be achieved by, for example, activating a drive roller of the line feed system in the counter-clockwise direction (FIG. 5). Once TLA is launched, a winch may be activated to deploy the towbody (FIG. 1). With each system deployed, any number of desired search or scanning operations may be performed using the transmit and receive assets alone or in combination.

It should be understood that the order of deployment of the TLA and the towbody may be altered in the case of, for example, a line feed system arranged on the towbody as distinct from a system arranged on the vessel. In this way, the TLA may deployed (i.e. pulled) from the stored position by the deployment of the towbody, and the TLA subsequently fed from the front of the towbody to a deployed position behind the towbody once the towbody is in the water behind the host vessel.

Retrieving the towbody and the TLA may include activating the winch to draw the towbody toward the bay of the host vessel. In the case of a host vessel having a ramp or similarly inclined retrieval system, a guide arm (18, FIG. 1) or other positioning device, may be operative to alter the pitch of the towbody to correspond to the incline of the ramp as the towbody is drawn thereto (FIG. 3). Towbody may be received by the ramp such that the TLA is placed in moveably contact with the line feed system. For example, a guide space on the towbody housing TLA 30 may be received by the above-described complementary guide arranged on the ramp such that the TLA is placed into contact with at least one driven roller arranged within the guide (FIGS. 4*a-b*).

Once the towbody is properly oriented within the guide, the line feed system may be activated, and the TLA retracted from the water behind the vessel by the clockwise rotation of at least one driven roller. As the TLA is recovered, it may be coiled into the above-described flaked configuration and stored, without disconnection from the towbody. The TLA may be considered fully recovered when the free end thereof (i.e. the end not attached to the towbody), reaches the rear of the towbody. In this way, the free end of the TLA remains within the guide space arranged on the towbody in a recovered or stored position, and only a portion of the length of TLA between the attached end and the free end is stored on the vessel. This eliminates the need to re-insert the free end of the TLA into the guide space on the towbody after each recovery.

While the foregoing invention has been described with reference to the above-described embodiment, various modifications and changes can be made without departing from the spirit of the disclosure. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A system comprising:
    a towed sonar body configured to be deployed aft of a host vessel;
    a deployment and recovery mechanism for deploying and recovering the towed sonar body from and to, respectively, the host vessel;
    a towed line array attached to a portion of the towed sonar body, the towed line array configured to remain attached to the towed sonar body during recovery and deployment; and
    a line feed mechanism comprising:
        a guide configured to receive a portion of the towed sonar body when the towed sonar body is in a recovered position on the vessel; and
        a driven roller arranged externally from the towed sonar body and configured to engage with the towed line array when the towed sonar body is received by the guide and in the recovered position on the vessel, the driven roller operative to a) move the towed line array relative to the towed sonar body along a first direction to recover the towed line array into a recovered position on the vessel, such that a majority of the towed line array is disposed on the vessel and remote from the towed sonar body; and b) move the towed line array relative to the towed sonar body along a second direction to deploy the towed line array from the recovered position on the vessel.

2. The system of claim 1, further comprising a line guide arranged on the towed sonar body, the line guide configured to receive a portion of the towed line array.

3. The system of claim 2, wherein the towed line array is attached to a first end of the towed sonar body, and the line guide is operative to orient the towed line array along a portion of the length of the towed sonar body such that the towed line array extends from the first end of the towed sonar body to a second end of the towed sonar body.

4. The system of claim 2, wherein the guide of the line feed mechanism is arranged on the host vessel, and wherein the line guide is arranged on an exterior surface of the towed sonar body and is configured to be received by the guide of the line feed mechanism.

5. The system of claim 4, wherein the guide of the line feed mechanism and line guide comprise complementary profiles.

6. The system of claim 2, wherein the line guide comprises at least one roller configured to engage with the towed line array.

7. The system of claim 6, wherein at least one roller is arranged within a space defined by the line guide.

8. The system of claim 6, wherein the at least one roller comprises a complementary profile with respect to the towed line array.

9. The system of claim 6, wherein the at least one roller is a free-spinning roller.

10. The system of claim 1, wherein the line guide of the towed body includes at least one roller disposed therein and operative to position the towed line array within the guide; and wherein the driven roller of the guide of the line feed mechanism engages with the towed line array on a side thereof opposite the at least one roller arranged within the line guide.

11. The system of claim 10, wherein the line feed mechanism comprises a plurality of rollers, and the at least one roller arranged within the line guide comprises a plurality of rollers.

12. The system of claim 11, wherein the plurality of line feed mechanism rollers and the plurality of line guide rollers are arranged in a staggered relationship.

13. The system of claim 1, wherein the line feed mechanism is operative to stow a portion of the towed line array in a figure eight configuration on the vessel.

14. An apparatus adapted to be mounted on a vessel for at least one of deploying and recovering a towed line array (TLA) attached to a towed body, the apparatus comprising:
    a line feed system comprising a driven roller arranged externally from the towed body and configured to engage with the towed line array when the towed body is in a recovered position on the vessel, the driven roller operative to a) move the towed line array relative to the towed body along a first direction to recover the towed line array into a recovered position on the vessel, such that a majority of the towed line array is disposed on the vessel and remote from the towed body; and b) move the towed line array relative to the towed body along a second direction to deploy the towed line array from the recovered position on the vessel,
    wherein the TLA remains attached to the towed body during recovery and deployment.

15. A method for at least one of deploying and recovering a towed line array (TLA) attached to a towed body from a vessel, the method comprising the steps of:

holding the towed body in a recovered position on the vessel;

activating a driven roller of a line feed system arranged externally from the towed body and engaged with the TLA for a) moving the TLA relative to the towed body along a first direction to recover the TLA into a recovered position on the vessel, such that a majority of TLA is disposed on the vessel and remote from the towed body; and b) moving the TLA relative to the towed body along a second direction to deploy the TLA from the recovered position on the vessel.

16. The method of claim 15, wherein the steps of moving the TLA along the first and second directions comprise displacing the TLA along the length of the towed body.

17. The method of claim 16, wherein the TLA is displaced along an exterior surface of the towed body between a first end of the towed body and a second end of the towed body.

* * * * *